(12) United States Patent
Schulte

(10) Patent No.: US 7,593,206 B2
(45) Date of Patent: Sep. 22, 2009

(54) LIGHTENING CONDUCTOR

(75) Inventor: Rolf Schulte, Remscheid (DE)

(73) Assignee: Setolite Lichttechnik GmbH, Wermelskirchen (DE)

( * ) Notice: Subject to any disclaimer, the term of this patent is extended or adjusted under 35 U.S.C. 154(b) by 208 days.

(21) Appl. No.: 11/425,035

(22) Filed: Jun. 19, 2006

(65) Prior Publication Data

US 2006/0285267 A1 Dec. 21, 2006

(30) Foreign Application Priority Data

Jun. 18, 2005 (DE) .................. 20 2005 009 590 U

(51) Int. Cl.
*H02H 1/00* (2006.01)
*H02H 1/04* (2006.01)
*H02H 3/22* (2006.01)
*H02H 9/06* (2006.01)
*H01C 7/12* (2006.01)
*H02H 9/00* (2006.01)
*H02H 3/20* (2006.01)
*H02H 9/04* (2006.01)

(52) U.S. Cl. ................ 361/117; 361/118; 361/119; 361/56; 361/91.1

(58) Field of Classification Search .................. None
See application file for complete search history.

(56) References Cited

U.S. PATENT DOCUMENTS

| | | | | |
|---|---|---|---|---|
| 11,217 A | * | 7/1854 | Forbes | 174/2 |
| 1,221,723 A | * | 4/1917 | Guichard | 52/115 |
| 3,318,559 A | * | 5/1967 | Mullen | 248/539 |
| 3,548,069 A | | 12/1970 | Watanabe et al. | |
| 4,447,847 A | * | 5/1984 | Drulard | 361/117 |
| 5,036,785 A | * | 8/1991 | Kittredge et al. | 114/90 |
| 5,657,197 A | * | 8/1997 | Skinner et al. | 361/117 |
| 2003/0095411 A1 | | 5/2003 | Blackwelder | |

FOREIGN PATENT DOCUMENTS

| | | |
|---|---|---|
| DE | 83 19 425.8 U1 | 12/1983 |
| DE | 20 2004 003233 U1 | 4/2004 |
| DE | 20 2004 003 233 U1 | 6/2004 |
| EP | 0 736 651 A1 | 10/1996 |
| JP | 4347518 A | 12/1992 |
| JP | 2004311083 A | 11/2004 |

OTHER PUBLICATIONS

International Search Report, issued in corresponding European Application No. 06 11 5355, completed Dec. 21, 2007.
The Webster's New Collegiate Dictionary, p. 1242 (1977).

* cited by examiner

Primary Examiner—Albert W Paladini
Assistant Examiner—Dharti Patel

(57) ABSTRACT

A lightening conductor (10) for lightning protection of structures (37), particularly of mobile structures (37), comprises a conduit (18) connected to a mast (12) and provided for dissipation of a lightning current. The mast (12) is telescopable so that the height of the lightening conductor (10) can be individually adapted to local conditions and is transported conveniently.

20 Claims, 3 Drawing Sheets

LIGHTENING CONDUCTOR

This application claims priority from German Patent Application No. 2020050095907, filed Jun. 18, 2005, the entire disclosure of which is incorporated herein by reference.

FIELD OF THE INVENTION

The present invention relates to a lightening conductor provided to dissipate the lightening current of a lightening stroke so as to protect structures such as e.g., buildings, tents and the like, from damage caused by lightening strokes.

BACKGROUND OF THE INVENTION

Known lightening conductors normally comprise a long conductive rod projecting above the structure to be protected so that lightening generated during a thunderstorm will not strike the structure but the rod. For this purpose, the rod is normally fastened to the structure at a point as high up on the structure as possible. Connected to the rod is a conduit which, at a site remote from the structure, is grounded for dissipation of the current generated by a lightening stroke.

From DE 20 2004 003 233 U1, it is known to attach a lightening conductor of the above type to the antenna mast of a cellular network antenna, which is to be protected from lightning.

Disadvantageously, a lightening conductor of the above outlined type requires a constructional component having significant stability and being arranged at a considerably elevated position so that the lightening conductor can function properly for protecting the structure from lightening strokes. Thus, the selection of a suitable site for the lightening conductor is subjected to considerable restrictions. Particularly if lightning protection is desired for mobile structures such as e.g. tents, it may be possible only with difficulties to make a part of the tent available for use as a sufficiently stable and accessible attachment site.

It is an object of the present invention to provide a lightening conductor which is improved for use in a larger variety of places and which is particularly suited for lightning protection of mobile structures.

SUMMARY OF THE INVENTION

According to the present invention, the above object is achieved by the features of a lightening conductor for lightning protection of structures, particularly of mobile structures (37), wherein the lightening conductor includes: (a) a mast (12); and (b) at least one conduit (18) connected to the mast (12) for dissipating a lightning current, wherein the mast (12) is at least partially telescopable.

Thus, the lightening conductor of the present invention, provided for lightning protection of structures and particularly of mobile structures, comprises a mast and at least one electrical conduit connected to the mast for dissipation of a lightning current. In this arrangement, the lightning to be dissipated can be captured by the conduit and/or by a lightning rod attached to the mast while insulated therefrom; in the latter case, the lightning rod is electrically connected to the conduit. According to the invention, the mast is at least partially telescopable so that at least a partial section of the mast is variable in length, preferably in a continuous manner.

Since the mast is telescopable, a conical protection space provided by the lightening conductor in which persons and objects will be protected from lightning strokes can be individually adapted to the local conditions; thus, particularly, a lightning protection space covered by the above protection cone and having the to-be-protected structures arranged therein can be adapted as required in the respective situation. Particularly, the mast of the lightening conductor in its retracted state can be of a length which is short enough to allow for easy transportation of the lightening conductor so that the lightening conductor can be reused a plurality of times at different sites. Since the lightening conductor can be transported easily, it will be especially suited for lightning protection of mobile structures such as e.g. tents, conveyance goods which have been placed outdoors, or apparatus which are not in easy reach under the logistic aspect.

According to a preferred embodiment, the mast is arranged to be telescoped pneumatically. This, for instance, allows for the connection of a pressurized air line and/or a pressurized air cartridge via a pressurized air connector so that the mast can be extended quickly and easily. Further, the pneumatic pressure required for telescoping the mast can be provided by an air pump connected to the mast and operable particularly by hand or with the aid of a foot. Preferably, the mast is provided with a valve by which the air needed for telescoping the mast can be discharged. The valve can also be used for the supply of pressurized air, if required. Preferably, the valve can be operated manually.

Preferably, the telescopable mast of the lightening conductor comprises a plurality of mast elements interconnected for telescoping movement relative to each other. In this arrangement, respectively adjacent mast elements, i.e. mast elements which in the extended state directly follow each other, can be connected to each other by a fastening element and can be arrested and/or locked relative to each other. Particularly, the fastening element comprises a spring-biased fastening element in order to automatically connect the mast elements, thus effecting a permanent locking of the mast elements to each other, which locking effect can be released only by user intervention. This makes it possible, for instance, by application of a pneumatic pressure, to provide a force which by a simple manipulation can be utilized for moving the respectively released mast element from a retracted state into an extended state.

Preferably, the mast can be temporarily fastened to an underlying ground surface. For this purpose, the mast is provided e.g. with a foot adapted for attachment to the ground surface. The foot can be configured e.g. as a tripod to be attached to the ground surface with the aid of anchor stakes of the type normally used e.g. for putting up tents. To compensate for unevenness of the ground surface, the mast is provided with leveling elements, particularly of the height-variable and length-variable type, by which the mast can be leveled to give it a substantially vertical orientation.

Preferably, the mast has mast spacers connected thereto so that the conduit can be guided at a distance from the mast and substantially parallel thereto. At least some of the spacers can be formed with eyes which are used for guidance of the conduit therethrough; these mast spacers are preferably connected to the mast elements. Further, bottom spacers can be provided for guiding the conduit at a distance from the underlying ground surface. Thereby, the conduit can be guided substantially horizontally away from the mast. Preferably, on its end facing away from the mast, the conduit is connected with a deep grounding means for dissipating the lightning current into the underlying ground. It can also be provided, particularly in case of hard, compact underlying ground, to connect the conduit to a star-type grounding means which, while arranged at a low depth, is oriented substantially horizontally in the ground.

Preferably, a plurality of lightening conductors of the invention are combined into a lightning protection system wherein the lightening conductors are arranged in such a manner that the individual protection spaces of the respective lightening conductors will form a common cohesive lightning protection space. Particularly, this lightning protection space is large enough to accommodate tents to be put up therein for protection from lightning. The lightning protection space has a surface area of at least 11 m×11 m, preferably at least 20 m×20 m and most preferably at least 25 m×25 m. The electrical conduits of the individual lightening conductors are preferably guided to lead away from the common lightning protection space wherein the tents are arranged.

A preferred embodiment of the invention will be described in greater detail hereunder with reference to the accompanying drawings.

DETAILED DESCRIPTION OF PREFERRED EMBODIMENTS

Figure 1:
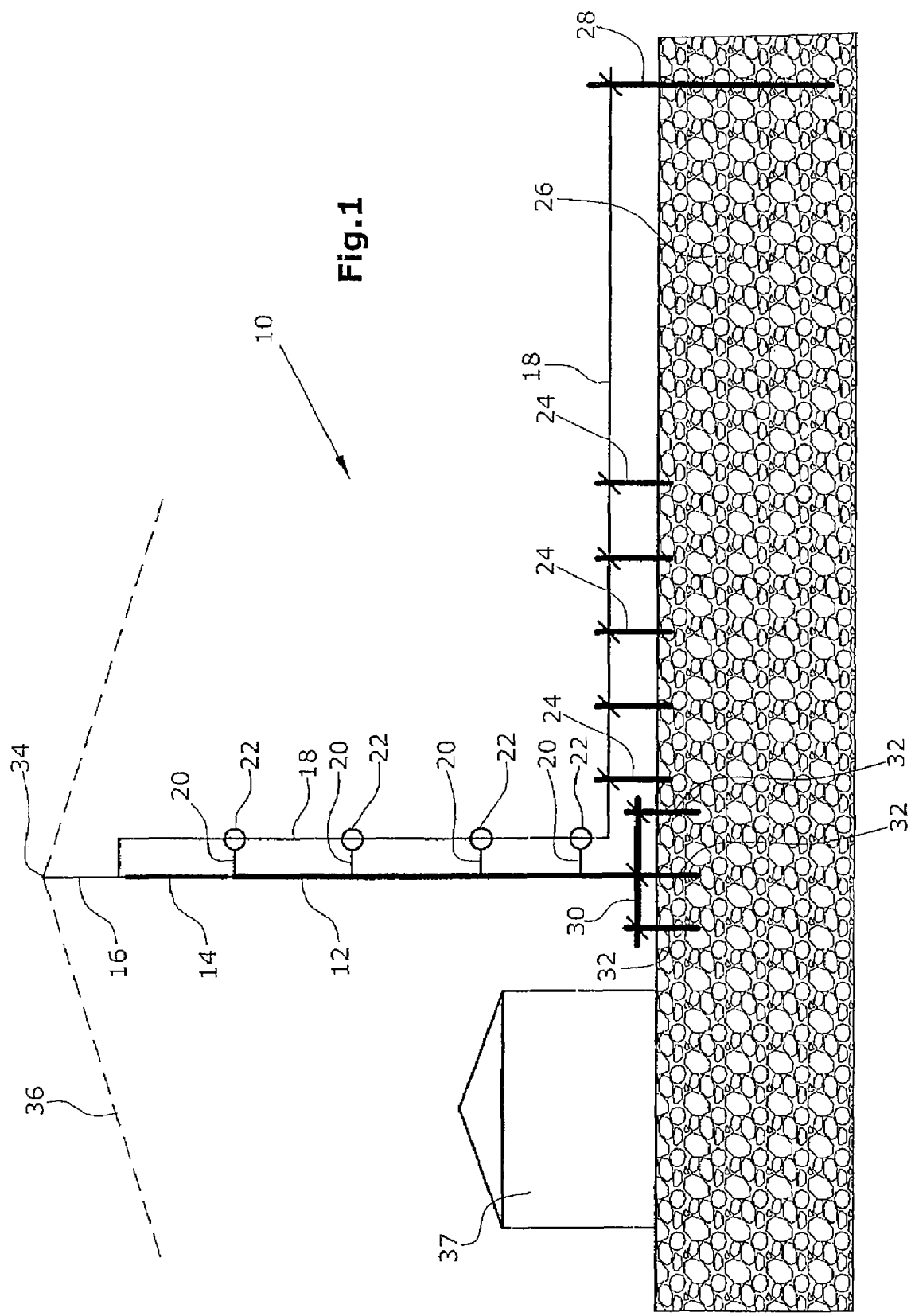
FIG. 1 is a schematic lateral view of the lightening conductor of the invention.

The lightening conductor 10 illustrated in FIG. 1 comprises a mast 12 to which is connected, via an insulating element 14 having a length of about 1.5 m, a lightning rod 16 for capturing lightning, which rod is made of aluminum and has a length of about 2 m. The lightning rod 16, being insulated from the mast 12 which has a length of about 6 m, has connected thereto an electrical conduit 18 which is vertically guided in parallel to mast 12 with the aid of mast spacers 20. For this purpose, the electrical conduit 18 is guided through eyes 22 formed in the mast spacers 20. In the lower region of mast 12, conduit 18 is deflected by about 90°, thus extending substantially horizontally. In its horizontal part, conduit 18 is held at a distance to the underlying ground 26 by means of bottom spacers 24. At a distance of about 10 m from mast 12, conduit 18 is connected to one or a plurality of deep grounding means 28 extending about three meters into the ground 26.

The mast spacers 20 attached to mast 12 can also be provided as cable ties which, by the effect of their own stiffness, keep the conduit 18 guided on mast 12 at a distance of about one meter from the mast.

Mast 12 is further fastened to a tripod 30 which, by use of anchor stakes 32, is tightly fastened to the underlying ground 26 on a temporary basis.

In case of a thunderstorm, lightning will tend to strike primarily into the lightning rod 16 of lightening conductor 10 so that the lightning current can be dissipated into the ground 26 via conduit 18. As a result, the lightening conductor 10 generates a protection cone 36 starting from an upper tip 34 of the lightening conductor. Within this cone, objects such as, e.g. a tent 37, can be arranged for protection from lightning.

Figure 2:
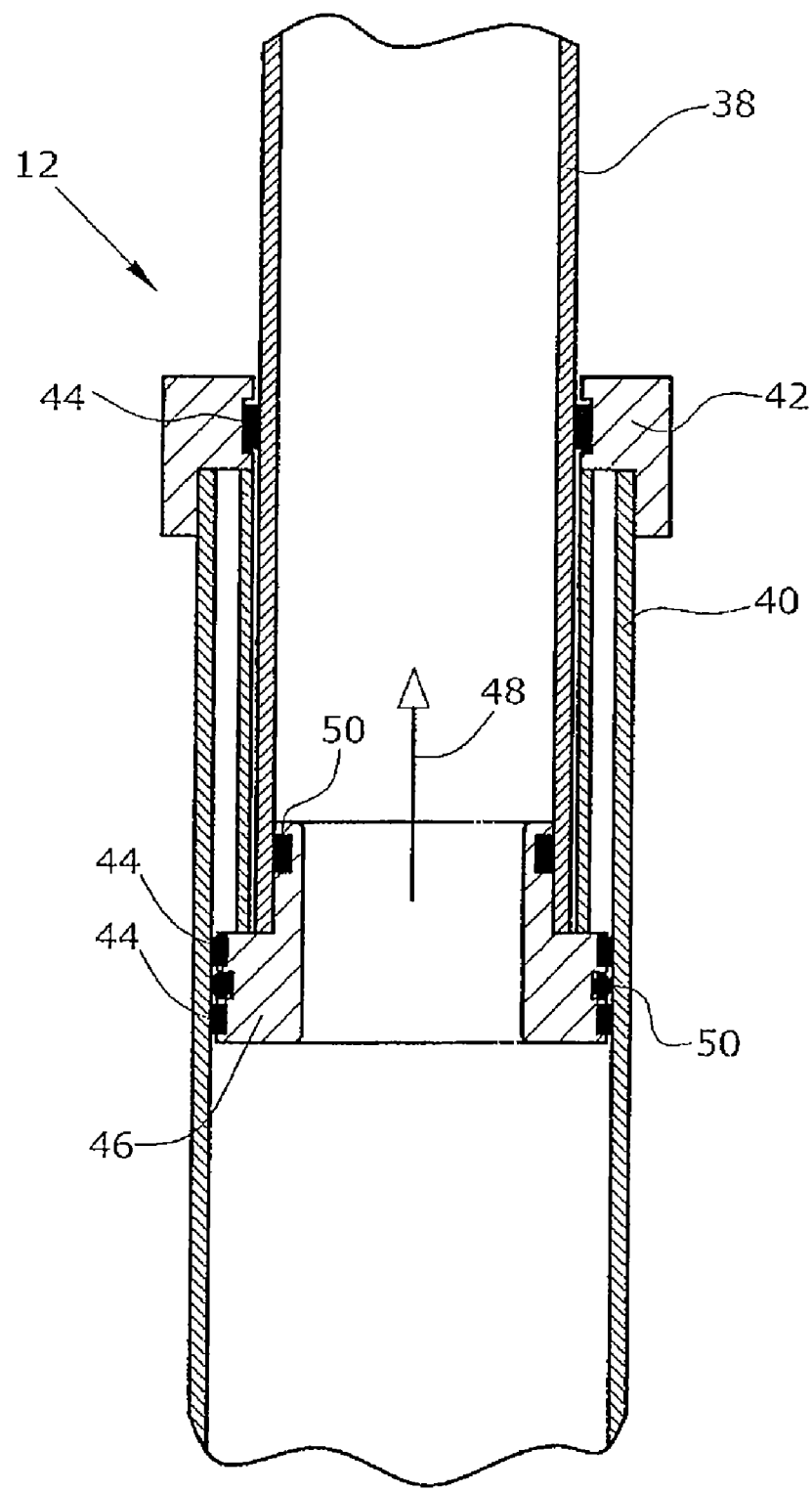
FIG. 2 is a schematic sectional view of a telescopable mast of the lightening conductor illustrated in FIG. 1.

Mast 12 is arranged to be telescopically extended and retracted (FIG. 2) and comprises a first mast element 38 guided for movement in a second mast element 40. For guidance of the first mast element 38 in the second mast element 40, the first mast element 38 in an upper region thereof is passed through a guide ring 42 wherein the contact of a the guide ring 42 with the first mast element 38 is accomplished by a slide ring 44 preferably made of Teflon®. The guide ring 42 is tightly connected to the second mast element 40, e.g. by clamping, and may be provided with a fastening element (not shown) for locking the first mast element 38 to the second mast element 40. In the lower region, the first mast element 38 is guided in the second mast element 40 via a piston 46, the contact of the piston 46 to the second mast element 40 being effected via further slide rings 44.

For pneumatic actuation of the telescopable mast 12, air pressure is caused to press against piston 46 and/or a closure member of mast 12 in the upper region whereby the first mast element 38 is pressed or pulled out from the second mast element 40 in the direction schematically indicated by arrow 48. To avoid escape of the pressurized air, piston 46 is provided, at the site of its contact to the first mast element 38 and at the site of its contact to the second mast element 40, with a respective O-ring 50 and/or a sealing means of a comparable effect.

Figure 3:
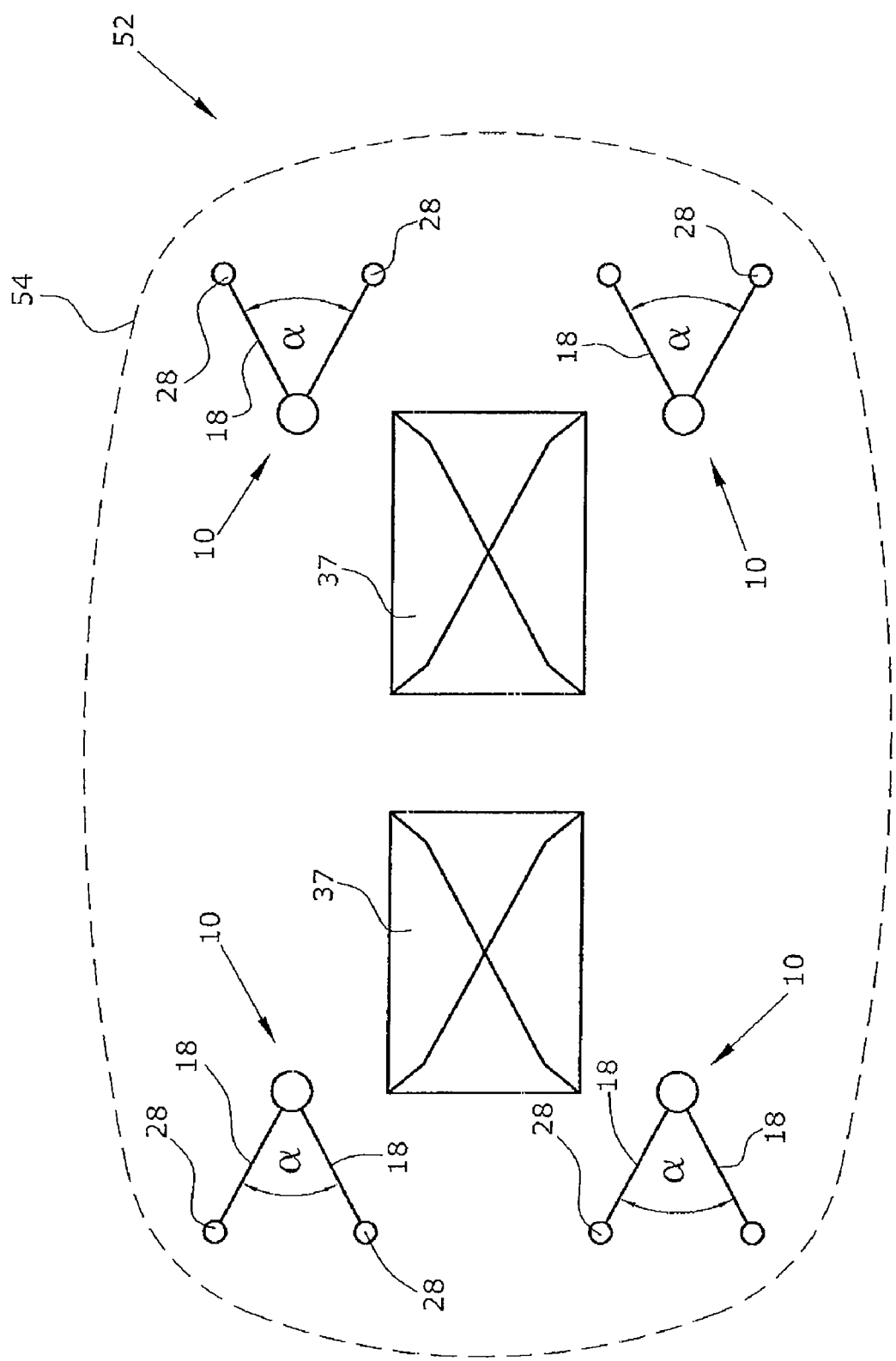
FIG. 3 is a schematic plan view of a lightning protection system of the invention.

In a further embodiment of a lightning protection system 52 illustrated in FIG. 3, four preferably identical lightening conductors 10 are provided, with their protection cones 36 forming a common lightning protection space 54 that is suited for arrangement of e.g. a plurality of tents 37 therein. The lightening conductors 10 each are provided with two electrical conduits 18 leading away from the tents 37 and the lightning protection space 54 at an angle α=about 90° relative to each other. This means that the conduits 18 arranged in the lightning protection space 54 are oriented to point away in outward directions from the lightning protection space 54. Depending on the lengths of the conduits 18 the deep grounding means 28 can be arranged inside or outside the lightning protection space 54.

The invention claimed is:

1. A transportable lightening conductor for lightning protection of structures, particularly of mobile structures, wherein the lightening conductor comprises:
    a mast; and
    at least one conduit connected to the mast for dissipating a lightning current,
    wherein the mast is at least partially telescopable, and
    wherein the mast is pneumatically telescopable, and
    wherein the mast has connected thereto height-variable or length-variable leveling means for leveling the mast, wherein the lightening conductor is manipulable between a retracted state and an extended state, wherein in the extended state the lightening conductor provides lightening protection and in the retracted state the lightening conductor is transportable.

2. The transportable lightening conductor according to claim 1, wherein the mast is provided with a pressurized air connector for connection of a pressurized air line, or for connection of a pressurized cartridge, or for connection of the pressurized air line and the pressurized cartridge.

3. The transportable lightening conductor according to claim 1, wherein the mast has connected thereto a pneumatic pump.

4. The transportable lightening conductor according to claim 1, wherein the mast is provided with a valve for supply of pressurized air, or for discharge of pressurized air, or for supply and discharge of pressurized air.

5. The transportable lightening conductor according to claim 1, wherein the mast comprises a plurality of mast elements connected to each other for telescoping movement relative to each other, wherein respectively successive mast elements are connectable to each other by a fastening element.

6. The transportable lightening conductor according to claim 1, wherein the mast has a foot member attached thereto for temporary attachment of the mast to the underlying ground.

7. The transportable lightening conductor according to claim 1, wherein mast spacers are provided to guide the conduit at a distance from the mast and substantially parallel to the mast.

8. The transportable lightening conductor according to claim 5, wherein at least a part of the mast spacers are connected to mast elements and these mast spacers are each provided with an eye for passing the conduit therethrough.

9. The transportable lightening conductor according to claim 1, wherein bottom spacers are provided for guiding the conduit at a distance to an underlying ground.

10. The transportable lightening conductor according to claim 1, wherein the conduit is connected to a deep grounding means, or to a star-type grounding means, for dissipating the lightning current into the underlying ground.

11. The transportable lightening conductor according to claim 1, wherein the mast has a lightning rod connected thereto for capturing lightning, wherein said lightning rod is electrically insulated relative to the mast by an insulating element and is electrically connected to the conduit.

12. A lightning protection system comprising:
   a plurality of transportable lightening conductors according to claim 1 arranged to form a lightning protection space adapted to have tents placed therein for protection from lightening.

13. The lightning protection system according to claim 12, wherein the lightning protection space has a surface area of at least 11 m×11 m.

14. The lightning protection system according to claim 12, wherein the conduits of the lightning conductors lead away from the lightning protection space.

15. The transportable lightening conductor according to claim 1, wherein the mast has connected thereto a manually operable pneumatic pump.

16. The transportable lightening conductor according to claim 1, wherein the mast is provided with a manually operable valve for supply of pressurized air, or for discharge of pressurized air, or for supply and discharge of pressurized air.

17. The lightning protection system according to claim 12, wherein the lightning protection space has a surface area of at least 20 m×20 m.

18. The lightning protection system according to claim 12, wherein the lightning protection space has a surface area of at least 25 m×25 m.

19. A transportable lightening conductor for lightning protection of structures, particularly of mobile structures, wherein the lightening conductor comprises:
   (a) a mast comprising
      i. a plurality of mast elements connected to each other for telescoping movement relative to each other, wherein respectively successive mast elements are connectable to each other by a fastening element;
   (b) at least one conduit connected to the mast for dissipating a lightning current;
   (c) a foot member attached to the mast for temporary attachment of the mast to underlying ground; and
   (d) a lightning rod connected to the mast for capturing lightning, wherein the lightning rod is electrically insulated relative to the mast by an insulating element and the lightening rod is electrically connected to the at least one conduit, wherein the mast is at least partially telescopable, and wherein the mast is pneumatically telescopable, and wherein the mast has connected thereto height-variable or length-variable leveling means for leveling the mast, and wherein the lightening conductor is manipulable between a retracted state and an extended state, wherein in the extended state the lightening conductor provides lightening protection and in the retracted state the lightening conductor is transportable.

20. The transportable lightening conductor according to claim 19, wherein the plurality of mast elements includes a first mast element guided for movement in a second mast element via a piston.

* * * * *

UNITED STATES PATENT AND TRADEMARK OFFICE
CERTIFICATE OF CORRECTION

PATENT NO. : 7,593,206 B2
APPLICATION NO. : 11/425035
DATED : September 22, 2009
INVENTOR(S) : Rolf Schulte It is certified that error appears in the above-identified patent and that said Letters Patent is hereby corrected as shown below:

Page 1, at the title (54), please change the spelling of the title as follows:

Please change the title from "LIGHTENING CONDUCTOR" to --LIGHTNING CONDUCTOR--.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,593,206 B2 | Page 1 of 1 |
| APPLICATION NO. | : 11/425035 | |
| DATED | : September 22, 2009 | |
| INVENTOR(S) | : Rolf Schulte | |

It is certified that error appears in the above-identified patent and that said Letters Patent is hereby corrected as shown below:

Title Page, Item (54) and at Column 1, line 1, at the title, please change the spelling of the title as follows:

Please change the title from "LIGHTENING CONDUCTOR" to --LIGHTNING CONDUCTOR--.

This certificate supersedes the Certificate of Correction issued October 26, 2010.

Signed and Sealed this

Twenty-third Day of November, 2010

David J. Kappos
*Director of the United States Patent and Trademark Office*